(12) United States Patent
Tannous et al.

(10) Patent No.: US 10,936,451 B2
(45) Date of Patent: Mar. 2, 2021

(54) CONCURRENT REMOTE IO PROCESSING FOR SYNCHRONOUS REPLICATION

(71) Applicant: EMC IP HOLDING COMPANY LLC, Hopkinton, MA (US)

(72) Inventors: Toufic Tannous, Solon, OH (US); Bhaskar Bora, Shrewsbury, MA (US); Deepak Vokaliga, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 127 days.

(21) Appl. No.: 16/168,910

(22) Filed: Oct. 24, 2018

(65) Prior Publication Data

US 2020/0133807 A1 Apr. 30, 2020

(51) Int. Cl.
*G06F 3/06* (2006.01)
*G06F 12/126* (2016.01)
*G06F 12/0868* (2016.01)
*G06F 12/084* (2016.01)
*G06F 12/02* (2006.01)
*G06F 11/20* (2006.01)

(52) U.S. Cl.
CPC .......... *G06F 11/2082* (2013.01); *G06F 3/061* (2013.01); *G06F 3/065* (2013.01); *G06F 3/067* (2013.01); *G06F 3/0659* (2013.01); *G06F 11/2064* (2013.01); *G06F 11/2076* (2013.01); *G06F 12/0292* (2013.01); *G06F 2201/82* (2013.01); *G06F 2201/825* (2013.01)

(58) Field of Classification Search
CPC .... G06F 11/2082; G06F 3/0659; G06F 3/067; G06F 11/2064; G06F 3/065; G06F 12/0292; G06F 11/2076; G06F 3/061; G06F 2201/82; G06F 2201/825

See application file for complete search history.

(56) References Cited

U.S. PATENT DOCUMENTS

| | | | | |
|---|---|---|---|---|
| 5,586,291 | A * | 12/1996 | Lasker | G06F 11/1435 711/113 |
| 7,032,089 | B1 * | 4/2006 | Ranade | G06F 11/2069 711/161 |
| 7,475,099 | B2 * | 1/2009 | Doatmas | G06F 11/1458 |
| 7,571,290 | B1 * | 8/2009 | Ranade | G06F 11/2069 707/999.202 |

(Continued)

*Primary Examiner* — Christopher D Birkhimer
(74) *Attorney, Agent, or Firm* — Anderson Gorecki LLP

(57) ABSTRACT

In a data storage system in which a first storage array and a second storage array maintain first and second replicas of a production volume, the first storage array is responsive to a write command from a host to send a notification to the second storage array indicating that the replicated production volume will be updated. The notification has information that enables the second storage array to implement pre-processing steps to prepare for subsequent receipt of data associated with the write command. Both storage arrays implement the pre-processing steps at least partly concurrently. When the data associated with the write command is subsequently received, the first storage array writes the data to cache and then sends a copy of the data to the second storage array, i.e. in series. The second storage array then writes the data to cache. Elapsed time between receipt of the write command and returning an acknowledgment to the host may be improved by concurrent pre-processing.

17 Claims, 4 Drawing Sheets

(56) References Cited

U.S. PATENT DOCUMENTS

| | | | | |
|---|---|---|---|---|
| 7,617,369 B1* | 11/2009 | Bezbaruah | G06F 11/2076 | 711/162 |
| 8,027,951 B2* | 9/2011 | Doatmas | G06F 11/1458 | 707/610 |
| 8,190,811 B2* | 5/2012 | Moon | G06F 3/061 | 711/103 |
| 8,645,546 B2* | 2/2014 | Lee | H04L 67/1002 | 709/226 |
| 8,689,043 B1* | 4/2014 | Bezbaruah | G06F 11/2074 | 714/6.3 |
| 8,719,220 B2* | 5/2014 | Kawaguchi | G06F 11/1456 | 707/616 |
| 8,793,380 B2* | 7/2014 | Lee | H04L 67/1002 | 709/226 |
| 9,946,485 B1* | 4/2018 | Don | G06F 3/0617 | |
| 9,948,696 B2* | 4/2018 | Lee | H04L 67/10 | |
| 10,003,647 B2* | 6/2018 | McCabe | G06F 3/0626 | |
| 10,037,154 B2* | 7/2018 | Provenzano | G06F 11/1464 | |
| 10,042,710 B2* | 8/2018 | Mutalik | G06F 3/067 | |
| 2005/0193247 A1* | 9/2005 | Doatmas | G06F 11/2064 | 714/13 |
| 2006/0005074 A1* | 1/2006 | Yanai | G06F 3/061 | 714/6.32 |
| 2008/0162847 A1* | 7/2008 | Doatmas | G06F 11/2064 | 711/162 |
| 2010/0312983 A1* | 12/2010 | Moon | G06F 12/0246 | 711/170 |
| 2011/0307654 A1* | 12/2011 | Ma | G06F 3/0613 | 711/105 |
| 2012/0079229 A1* | 3/2012 | Jensen | G06F 3/0643 | 711/170 |
| 2012/0304006 A1* | 11/2012 | Kawaguchi | G06F 11/1456 | 714/20 |
| 2012/0304189 A1* | 11/2012 | Tominaga | G06F 3/067 | 718/104 |
| 2014/0297830 A1* | 10/2014 | Lee | H04L 67/1002 | 709/223 |
| 2014/0337589 A1* | 11/2014 | Carpenter | G06F 3/0632 | 711/157 |
| 2016/0134698 A1* | 5/2016 | McCabe | G06F 3/0626 | 709/217 |
| 2017/0357553 A1* | 12/2017 | Zhao | G06F 11/1464 | |
| 2017/0371597 A1* | 12/2017 | Jia | G06F 12/0804 | |
| 2018/0234488 A1* | 8/2018 | Lee | H04L 67/1002 | |

* cited by examiner

CONCURRENT REMOTE IO PROCESSING FOR SYNCHRONOUS REPLICATION

BACKGROUND

The subject matter of this disclosure is generally related to computer networks in which two or more storage arrays maintain a replicated logical production volume. The production volume is used to store host application data for host applications running on host servers. Each storage array includes interconnected computing nodes that manage access to non-volatile drives. The production volume abstracts the managed drives by representing non-contiguous addresses of various managed drives as a set of contiguous LBAs (logical block addresses). Host servers may access host application data from either a primary-side replica (R1) or a secondary-side replica (R2) by sending IOs to one of the storage arrays.

Because the host servers can access host application data from any replica of the production volume, there is a need to maintain consistency between replicas, e.g. R1 and R2. This is accomplished by serializing the processing of IOs that update the production volume. For example, a primary-side storage array that is a target of a write command from a host server initiator determines which LBAs of the production volume are associated with the write command. The primary storage array then implements locks to prevent other IOs from being implemented on those LBAs of R1. The data associated with the write command is then written to local cache of the primary storage array. The primary storage array then initiates a corresponding write to the secondary storage array. The secondary storage array receives the write command and implements locks to prevent other IOs from being implemented on those LBAs of R2. The data associated with the write command is then written to local cache of the secondary storage array. The secondary storage array then sends an acknowledgement to the primary storage array indicating that the write has been implemented. The primary storage array then sends an acknowledgment to the host computer indicating that the write has been implemented. The elapsed time between the primary storage array receiving the write command and sending the corresponding acknowledgement to the host computer is an indication of performance.

SUMMARY

All examples, aspects, and features mentioned in this document can be combined in any technically conceivable way.

In accordance with an aspect an apparatus comprises: a first storage array comprising a plurality of interconnected computing nodes, each of the computing nodes comprising at least one processor and non-transitory memory, and a plurality of groups of data storage drives, each group of data storage drives connected with one of the computing nodes, wherein the first storage array maintains a first replica of a replicated volume comprising contiguous logical block addresses that map to non-contiguous addresses of the data storage drives; program code, responsive to receipt of an IO command that will update the replicated volume, which generates a notification an IO that will update the replicated volume is impending, the notification comprising information that enables implementation of pre-processing to prepare for receipt of data associated with the impending IO; program code that provides the notification to a second storage array that maintains a second replica of the replicated volume; and program code that implements the pre-processing to prepare for receipt of data associated with the impending IO at least partly concurrently with implementation of the pre-processing by the second storage array. In some implementations the notification indicates LBAs (logical block addresses) affected by the impending IO. In some implementations the notification indicates at least one of: device number, cylinder number, head (track), and size. In some implementations the pre-processing comprises identifying metadata associated with the impending IO. In some implementations the pre-processing comprises using the identified metadata to identify locations in volatile memory associated with the impending IO. In some implementations the pre-processing comprises locking the identified locations. Some implementations comprise program code that writes the data to the memory at least partly concurrently with the second storage array writing the data to memory.

In accordance with an aspect a method comprises: in a network comprising: a first storage array comprising a plurality of interconnected computing nodes, each of the computing nodes comprising at least one processor and non-transitory memory, and a plurality of groups of data storage drives, each group of data storage drives connected with one of the computing nodes, wherein the first storage array maintains a first replica of a replicated volume comprising contiguous logical block addresses that map to non-contiguous addresses of the data storage drives; and a second storage array comprising a plurality of interconnected computing nodes, each of the computing nodes comprising at least one processor and non-transitory memory, and a plurality of groups of data storage drives, each group of data storage drives connected with one of the computing nodes, wherein the second storage array maintains a second replica of the replicated volume comprising contiguous logical block addresses that map to non-contiguous addresses of the data storage drives; the first storage array generating a notification that an impending IO that will update the replicated volume, the notification comprising information that enables implementation of pre-processing steps to prepare for receipt of data associated with the impending IO; the first storage array providing the notification to the second storage array; and the first storage array implementing the pre-processing steps to prepare for receipt of the data associated with the impending IO at least partly concurrently with implementation of the pre-processing steps by the second storage array. In some implementations generating the notification comprises indicating LBAs (logical block addresses) affected by the impending IO. In some implementations generating the notification comprises indicating at least one of: device number, cylinder number, head (track), and size. In some implementations implementing the pre-processing steps comprises identifying metadata associated with the impending IO. In some implementations implementing the pre-processing steps comprises using the identified metadata to identify locations in volatile memory associated with the impending IO. In some implementations implementing the pre-processing steps comprises locking the identified locations. In some implementations the first storage array writes the data to the memory at least partly concurrently with the second storage array writing the data to memory.

In accordance with an aspect a system comprises: a first storage array comprising a plurality of interconnected computing nodes, each of the computing nodes comprising at least one processor and non-transitory memory, and a plurality of groups of data storage drives, each group of data storage drives connected with one of the computing nodes, wherein the first storage array maintains a first replica of a replicated volume comprising contiguous logical block addresses that map to non-contiguous addresses of the data storage drives; and a second storage array comprising a plurality of interconnected computing nodes, each of the computing nodes comprising at least one processor and non-transitory memory, and a plurality of groups of data storage drives, each group of data storage drives connected with one of the computing nodes, wherein the second storage array maintains a second replica of the replicated volume comprising contiguous logical block addresses that map to non-contiguous addresses of the data storage drives; wherein the first storage array is responsive to a write command from a host to generate a notification that the replicated volume will be updated, the notification comprising information that enables implementation of pre-processing steps to prepare for subsequent receipt of data associated with the write command; wherein the first storage array provides the notification to the second storage array; and wherein the first storage array implements the pre-processing steps prior to receipt of the data and at least partly concurrently with implementation of the pre-processing steps by the second storage array. In some implementations the notification indicates LBAs (logical block addresses) affected by the impending IO. In some implementations the pre-processing steps comprise identifying metadata associated with the impending IO. In some implementations the pre-processing steps comprise using the identified metadata to identify locations in volatile memory associated with the impending IO. In some implementations the pre-processing steps comprise locking the identified locations. In some implementations the first storage array writes the data to the memory at least partly concurrently with the second storage array writing the data to memory.

Other aspects, features and implementations may become apparent in view of the detailed description and figures.

DETAILED DESCRIPTION

Some aspects, features, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The terms "physical" and "real" are used to refer to tangible features. For example, a virtual storage device could be based on multiple physical storage drives. The term "logic" is used to refer to one or more of special purpose electronic hardware and software instructions that are stored on a non-transitory computer-readable medium and implemented by general-purpose tangible processors.

Figure 1:
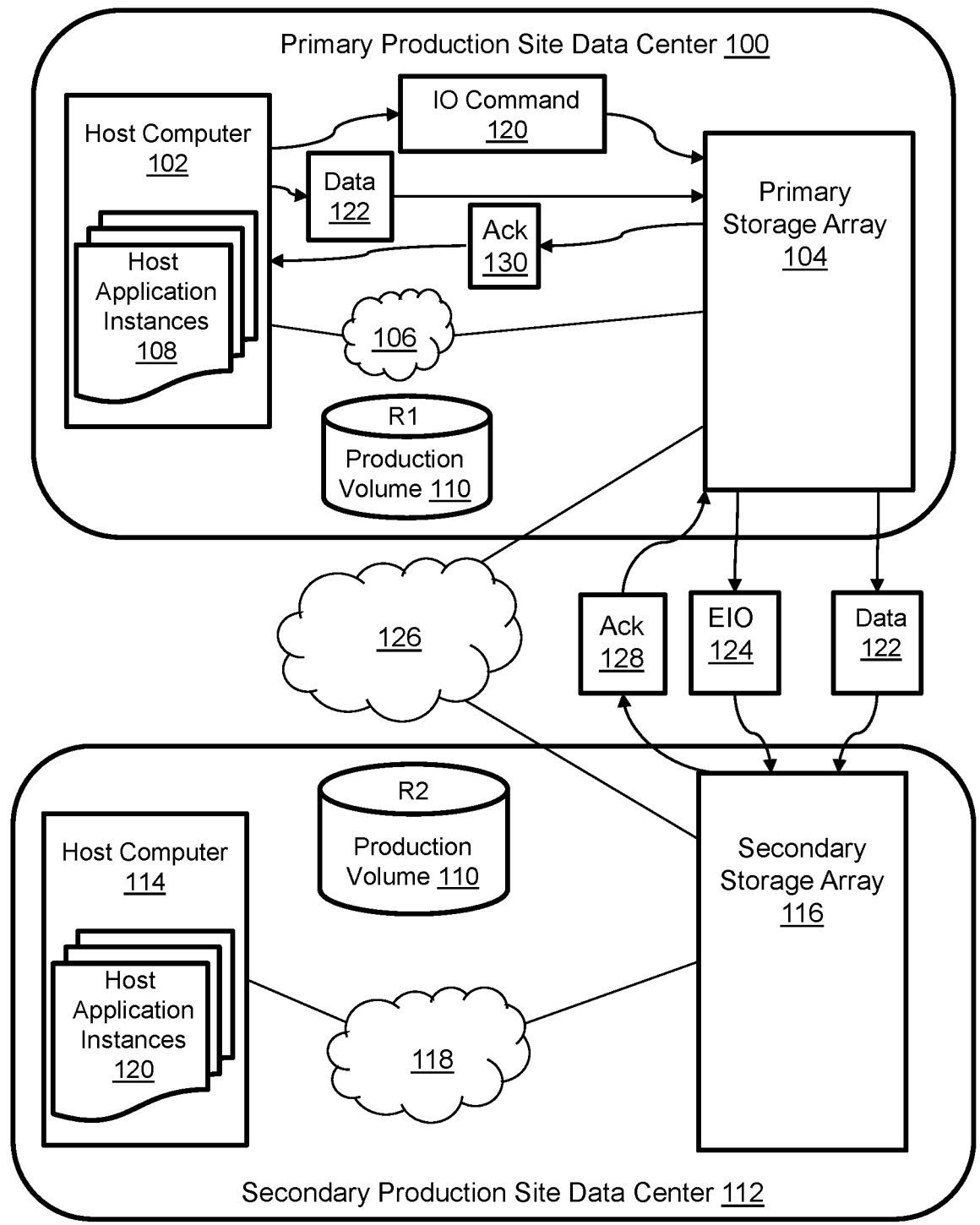
FIG. 1 illustrates a computer network in which concurrent remote IO processing is implemented with a replicated production volume in synchronous replication configuration.

FIG. 1 illustrates a computer network in which concurrent remote IO processing is implemented with a replicated production volume in synchronous replication configuration. A primary production site data center 100 includes at least one host computer 102 and at least one primary storage array 104, each of which is interconnected via a network 106. The host computer 102 runs host application instances 108. The primary storage array 104 creates and presents a first replica (R1) of a logical production volume 110 to the host computer 102 for storage of host application data. The production volume 110 may be referred to as a production device or production LUN, where LUN (Logical Unit Number) is a number used to identify the logical storage volume in accordance with the SCSI (Small Computer System Interface) protocol. The host computer 102 and storage array 104 may utilize SCSI (small computer system interface) or any other suitable protocol for implementing storage-related commands. The host computer 102 is an "initiator," which means that it issues IO commands. The storage array is a "target," which means that it implements IO commands.

In the illustrated example a secondary production site data center 112 includes at least one host computer 114 and at least one secondary storage array 116, each of which is interconnected via a network 118. However, it is not necessary that there is a host computer connected to the secondary storage array. The host computer 114 runs host application instances 120. The secondary storage array 116 presents a second replica (R2) of the logical production volume 110 to the host computer 114 for storage of the host application data. The host computer 114 and storage array 116 utilize SCSI or any other suitable protocol for implementing storage-related commands. The host computer 114 is an initiator and the storage array 116 is a target.

The production volume 110 is in a synchronous replication configuration and R2 can be read-enabled so R1 and R2 can be contemporaneously accessed by host computers, e.g. as targets of IO commands. Consequently, a process is implemented to maintain consistency between R1 and R2 as mirrors. In contrast with previous serialized processes, concurrent remote IO processing is implemented in the illustrated example. In response to an IO command 120 (e.g. a write) that will update the production volume 110, the primary storage array 104 implements pre-processing steps to prepare for receipt of data 122 corresponding to the IO command 120. Pre-processing may include a variety of steps such as locking the LBAs (logical block addresses) of R1 that are specified by the IO command 120. Further, the primary storage array 104 generates and provides a message referred to herein as an EIO (early IO) 124 to the secondary storage array 116 via network 126. The EIO is a notification of the impending IO and includes information, such as the LBAs being written, that enables secondary storage array 116 to implement pre-processing steps to prepare for receipt of the data 122 corresponding to the IO command 120. More particularly, the EIO 124 is provided to the secondary storage array 116 in a manner that enables pre-processing to be implemented by both the primary storage array for R1 and the secondary storage array for R2 partly or wholly in parallel (concurrently). When the data 122 is received by primary storage array 104 from host computer 102 sometime after receipt of IO command 120, a copy of the data 122 is provided to the secondary storage array 116 by the primary storage array 104 via network 126. Both storage arrays 104, 116 store the data 122 in their respective cache. Once the data 122 has been stored in the cache of the secondary storage array 116, an Ack (e.g. write acknowledgement) 128 is sent from the secondary storage array 116 to the primary storage array 104. Once the Ack 128 has been received from the secondary storage array 116, the primary storage array 104 sends an Ack 130 to host computer 102 indicating that the IO command 120 has been implemented. Because the remote IO processing, including pre-processing, is at least partly concurrent, the elapsed time between receipt of the IO command 120 and transmission of the Ack 130 is reduced relative to previous serialized processes for maintaining mirror consistency. Although the primary storage array receives the IO in the example described above, an IO sent by host computer 114 to the secondary storage array would prompt an EIO to be generated by the secondary storage array and sent to the primary storage array. The terms "primary" and "secondary" are not intended to be limiting.

Figure 2:
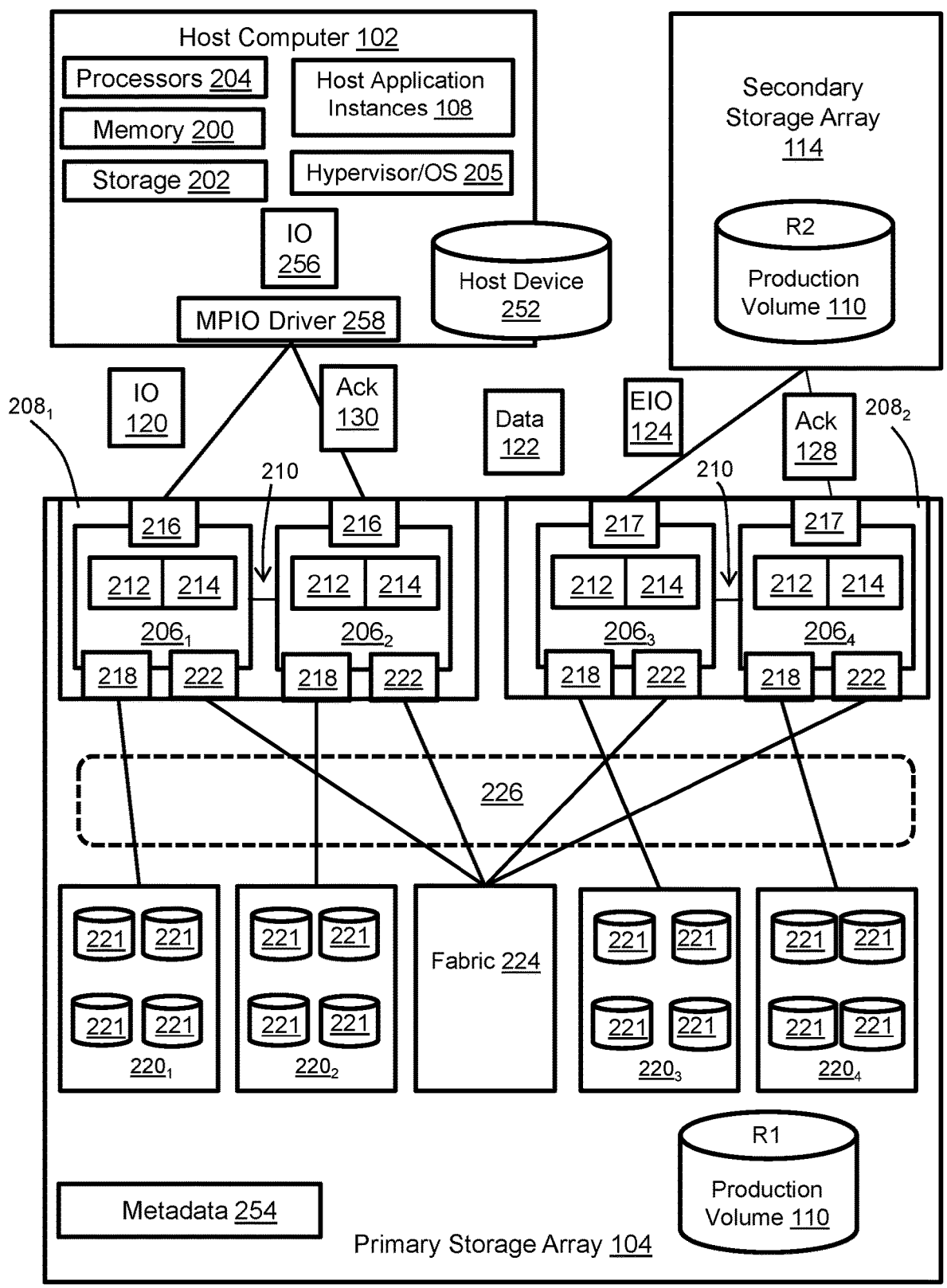
FIG. 2 illustrates the host computers and storage arrays of FIG. 1 in greater detail.

FIG. 2 illustrates aspects of the host computers and storage arrays of FIG. 1 in greater detail. Although only the primary storage array 104 is shown in detail, both the primary and secondary storage arrays may be identical or substantially similar. In the illustrated example the host computer 102 is a server with volatile memory 200, persistent storage 202, one or more tangible processors 204, and an OS (operating system) or Hypervisor 205. The host computer might support virtual hosts running on virtual machines or containers, and although an external host computer is illustrated, internal hosts may be instantiated within the storage arrays. The primary storage array 104 includes a plurality of computing nodes $206_1$-$206_4$. Pairs of the computing nodes, e.g. ($206_1$, $206_2$) and ($206_3$, $206_4$), may be organized as storage engines $208_1$, $208_2$, respectively, for purposes of failover. The paired computing nodes of each storage engine may be directly interconnected by communication links 210. Each computing node includes at least one tangible multi-core processor 212 and a local cache 214. The local cache 214 may include, for example and without limitation, volatile memory components such as RAM (random access memory) of any type. Some of the computing nodes $206_1$, $206_2$ include HAs (host adapters) 216 for communicating with the host computer 102. Some of the computing nodes $206_3$, $206_4$ include RAs (remote adapters) 217 for communicating with the secondary storage array 114. The computing nodes also include DAs (disk adapters) 218 for communicating with managed drives 221 in their respective back-end storage bays $220_1$-$220_4$. The managed drives 221 may include tangible storage components of one or more technology types, for example and without limitation SSDs (solid state devices) such as flash, and HDDs (hard disk drives) such as SATA (Serial Advanced Technology Attachment) and FC (Fibre Channel). The computing nodes may also include one or more CAs (channel adapters) 222 for communicating with other computing nodes via an interconnecting fabric 224. Each computing node may allocate a portion or partition of its respective local cache 214 to a virtual shared "global" cache 226 that can be accessed by other computing nodes, e.g. via DMA (direct memory access) or RDMA (remote direct memory access).

The primary storage array 104 maintains data for the host application instances 122 running on the host computer 102 (and other host computers), and the host application instances use storage services that are provided by the primary storage array. For example, the host applications may write host application data to the primary storage array and read host application data from the primary storage array in order to perform various functions. Examples of host applications may include but are not limited to file servers, email servers, block servers and databases. A host device 252 is a host computer-local representation of the production volume. The host device 252, production volume, and replicas represent abstraction layers between the managed drives 221 and the host application instances 108. From the perspective of the host application instances, the host device 252 is a single data storage device having a set of contiguous fixed-size LBAs on which data used by the host applications resides. However, the data used by the host applications may actually be maintained by the computing nodes $206_1$-$206_4$ at non-contiguous addresses on various different managed drives 221.

In order to service IOs from the host application instances 122, the primary storage array 104 maintains metadata 254 that indicates, among various things, mappings between storage space of the production volume and the locations of extents of host application data on the managed drives 221. In response to an IO command 256 from one of the host application instances to host device 252, an MPIO (Multi-Path Input-Output) driver 258 determines whether the IO can be serviced by accessing the host computer memory 200. If that is not possible then the MPIO driver generates IO command 120 with reference to the production volume 110 and selects a path on which to send the IO command to the primary storage array 104. There are multiple paths between the host computer 102 and the primary storage array 104, e.g. one path per HA 216. Each path may have a locally unique address that is known to the MPIO driver 258. However, the host application is not aware of the paths and addresses because it views the host device 252 as being available via a single logical path. The paths may be selected by the MPIO driver based on a wide variety of techniques and algorithms including, for context and without limitation, performance and load balancing. In the case of a read the primary storage array uses the metadata 254 to locate the requested data, e.g. in the shared cache 226 or managed drives 221. If the requested data is not in the shared cache, then it is temporarily copied into the shared cache from the managed drives and sent to the host application via one of the computing nodes. In the case of a write the storage array creates new metadata that maps the production volume address with a location to which the data is written on the managed drives 221. The shared cache 226 may enable the production volume 110 to be reachable via all of the computing nodes and paths, although the storage array can be configured to limit use of certain paths to certain production volumes.

A write such as IO command 120, and any other command that affects consistency of the replicated production volume 110 triggers concurrent pre-processing. As a result, EIO 124 is generated by the primary storage array and transmitted to the secondary storage array 114. Both the primary and secondary storage arrays then implement pre-processing steps. After receiving the corresponding data from the host computer, the primary storage array provides the data to the secondary storage array. Both storage arrays store the data 122 in their respective shared memory. The secondary storage array returns Ack 128 to the primary storage array 104 after storing the data in shared memory. The primary storage array returns Ack 130 to the host computer 102 after storing the data in shared memory and receiving Ack 128. Logic that implements concurrent pre-processing may be implemented by one or more of the computing nodes of each storage array.

Figure 3:
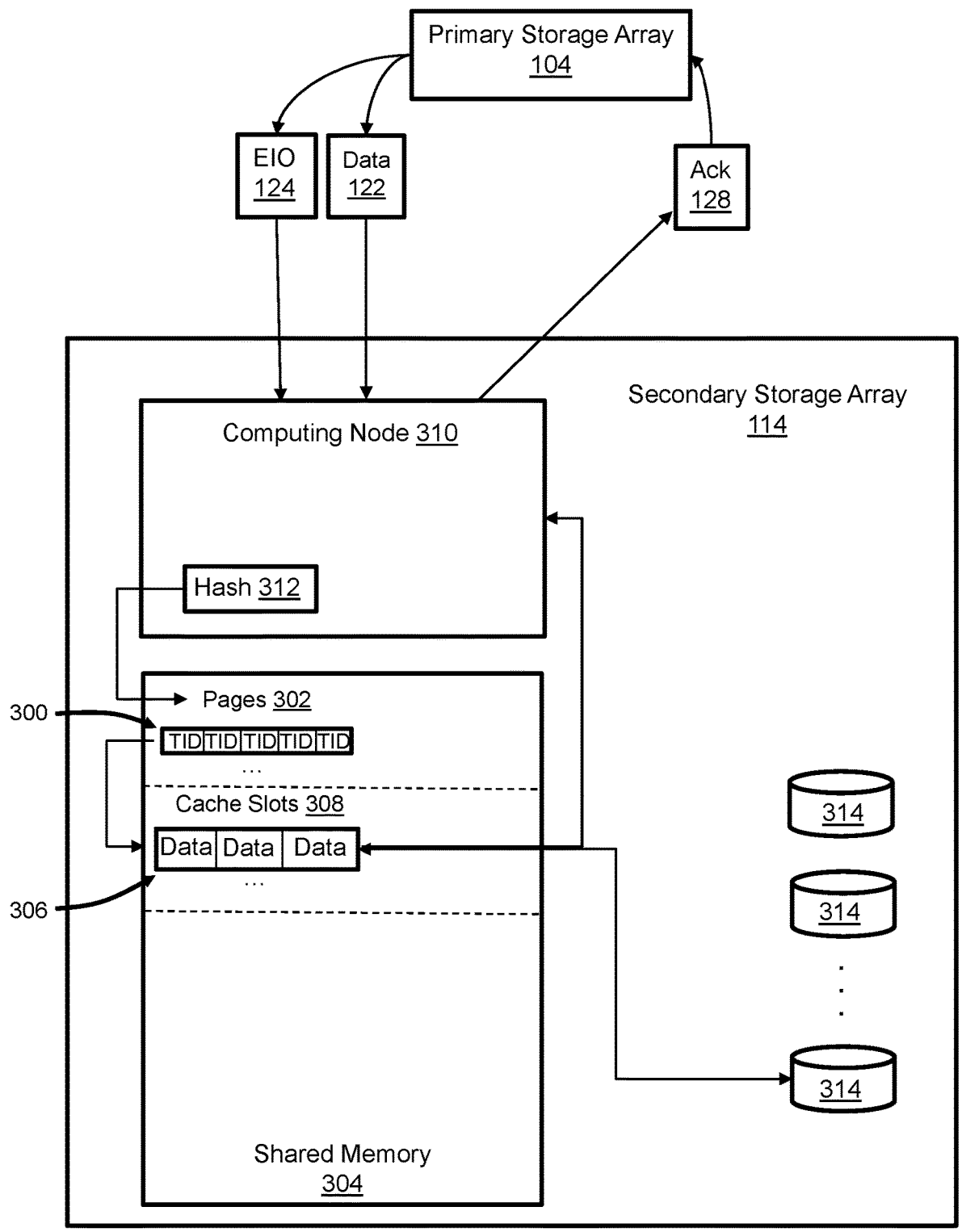
FIG. 3 illustrates aspects of concurrent remote IO processing by the storage arrays in greater detail.

FIG. 3 illustrates aspects of concurrent remote IO processing in greater detail. Although only the secondary storage array is shown in detail, both storage arrays may function in the same manner. Cached metadata may be maintained in TIDs (track ID tables) 300 that are stored in fixed-size pages 302 of the shared memory 304 of the secondary storage array 114. The TIDs 300 contain pointers to host application data 306 located in cache slots 308 in the shared memory 304. In response to EIO 124, computing node 310 identifies corresponding TIDs by inputting the device number, cylinder number, head (track), and size obtained from the EIO 124 into a hash table 312. A wide variety of descriptive data structures could be used, of which a hash table 312 is simply one example. The hash table 312 indicates the locations of the TIDs corresponding to the EIO in pages 302 by outputting a corresponding page number. The page number is used to locate the page that holds the TIDs. The TIDs are obtained from the pages and used to find the corresponding the cache slots 308. Those cache slots may then be locked. When the data 122 is received it is written to the pre-identified cache slots 308. The Ack 128 is then generated by the computing node 310 and sent to the primary storage array 104. The data 122 is eventually de-staged from the cache slots 308 to the managed drives 314. Identifying the TIDs and cache slots before receipt of the data 122 from the primary storage array may improve performance.

Figure 4:
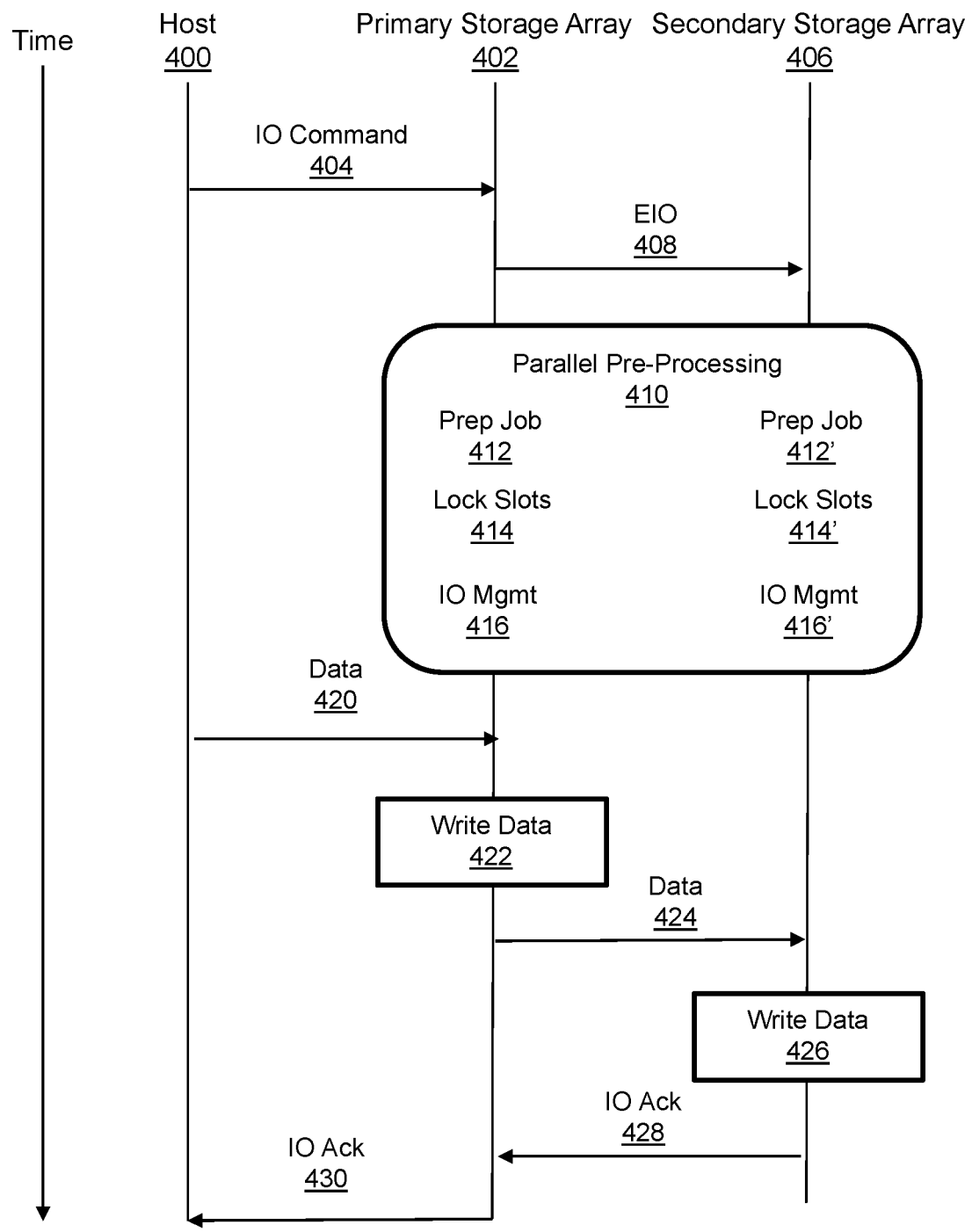
FIG. 4 is a process timing flowchart that illustrates aspects of concurrent remote IO processing.

FIG. 4 is a process timing flowchart that illustrates steps of concurrent remote IO processing. The process begins when an IO command is sent from a host computer 400 to a primary storage array 402 at step 404. If the IO command affects the consistency of the replicated production volumes presented by the primary storage array 402 and a secondary storage array 406 then an EIO is sent from the primary storage array 402 to the secondary storage array 406 in step 408. Based respectively on the IO command and EIO, the primary storage array 402 and the secondary storage array 406 implement parallel pre-processing in step 410. Steps that may be included in pre-processing 410 may include job preparation 412, 412', locking the cache slots 414, 414', and other IO management 416, 416'. Job preparation may include assigning a serial number to the IO and identifying the TIDs and cache slots. Locking the cache slots may include write-locks, read-locks, or read/write locks. Pre-processing is not necessarily wholly concurrent, and any concurrency is considered parallel for the purposes of this disclosure. After the data is sent from the host 400 to the primary storage array 402 in step 420, steps 422 through 426 are implemented in series. The primary storage array 402 writes the data to the identified cache slots in step 422. A copy of the data is provided to the secondary storage array 406 in step 424. It should be understood that the data may be provided to either or both of the storage arrays before pre-processing is complete. The secondary storage array 406 then writes the data to the identified cache slots in step 426. After writing the data in step 426, the secondary storage array 406 sends an IO Ack to the primary storage array 402 in step 428. After writing the data in step 424 and receiving the IO Ack in step 428, the primary storage array 402 sends an IO Ack to the host computer in step 430.

A number of features, aspects, examples, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a first storage array comprising a plurality of interconnected computing nodes, each of the computing nodes comprising at least one processor and non-transitory memory, and a plurality of groups of data storage drives, each group of data storage drives connected with one of the computing nodes, wherein the first storage array maintains a first replica of a replicated volume comprising contiguous logical block addresses that map to non-contiguous addresses of the data storage drives;
program code running on the first storage array, responsive to receipt of an IO command from a host that will update the replicated volume, which generates a notification that an IO that will update the replicated volume is impending, the notification being generated before data associated with the IO command is received by the first storage array and before the data associated with the IO command is received by the second storage array and comprising information that enables implementation of pre-processing to prepare for receipt of data associated with the impending IO, the information comprising logical block addresses that will be affected by the impending IO;
program code running on the first storage array that provides the notification to a second storage array that maintains a second replica of the replicated volume before the data associated with the IO command is received by the first storage array and before the data associated with the IO command is received by the second storage array; and
program code running on the first storage array and the second storage array that implements the pre-processing before the data associated with the IO command is received by the first storage array and before the data associated with the IO command is received by the second storage array to prepare for receipt of the data associated with the impending IO at least partly concurrently with implementation of the pre-processing by the second storage array, the pre-processing comprising locking the logical block addresses that will be affected by the impending IO.

2. The apparatus of claim 1 wherein the notification indicates at least one of: device number, cylinder number, head (track), and size.

3. The apparatus of claim 1 wherein the pre-processing comprises identifying metadata associated with the impending IO.

4. The apparatus of claim 3 wherein the pre-processing comprises using the identified metadata to identify locations in volatile memory associated with the impending IO.

5. The apparatus of claim 4 wherein the pre-processing comprises locking the identified locations.

6. The apparatus of claim 1 further comprising program code that writes the data to the memory at least partly concurrently with the second storage array writing the data to memory.

7. A method comprising:
in a network comprising:
- a first storage array comprising a plurality of interconnected first computing nodes, each of the first computing nodes comprising at least one processor and non-transitory memory, and a plurality of groups of first data storage drives, each group of first data storage drives connected with one of the first computing nodes, wherein the first storage array maintains a first replica of a replicated volume comprising contiguous logical block addresses that map to non-contiguous addresses of the first data storage drives; and
- a second storage array comprising a plurality of interconnected second computing nodes, each of the second computing nodes comprising at least one processor and non-transitory memory, and a plurality of groups of second data storage drives, each group of second data storage drives connected with one of the second computing nodes, wherein the second storage array maintains a second replica of the replicated volume comprising contiguous logical block addresses that map to non-contiguous addresses of the second data storage drives;
  - the first storage array generating a notification that an impending IO will update the replicated volume, the notification being generated before data associated with the impending IO is received by the first storage array and before the data associated with the impending IO is received by the second storage array and comprising information that enables implementation of pre-processing steps to prepare for receipt of data associated with the impending IO, the information comprising logical block addresses that will be affected by the impending IO;
  - the first storage array providing the notification to the second storage array before the data associated with the impending IO is received by the first storage array and before the data associated with the impending IO is received by the second storage array; and
  - the first storage array implementing the pre-processing steps to prepare for receipt of the data associated with the impending IO at least partly concurrently with implementation of the pre-processing steps by the second storage array and before the data associated with the impending IO is received by the first storage array and before the data associated with the impending IO is received by the second storage array, the pre-processing comprising locking the logical block addresses that will be affected by the impending IO.

8. The method of claim 7 wherein generating the notification comprises indicating at least one of: device number, cylinder number, head (track), and size.

9. The method of claim 7 wherein implementing the pre-processing steps comprises identifying metadata associated with the impending IO.

10. The method of claim 9 wherein implementing the pre-processing steps comprises using the identified metadata to identify locations in volatile memory associated with the impending IO.

11. The method of claim 10 wherein implementing the pre-processing steps comprises locking the identified locations.

12. The method of claim 7 further comprising the first storage array writing the data to the memory at least partly concurrently with the second storage array writing the data to memory.

13. A system comprising:
- a first storage array comprising a plurality of interconnected first computing nodes, each of the first computing nodes comprising at least one processor and non-transitory memory, and a plurality of groups of first data storage drives, each group of first data storage drives connected with one of the first computing nodes, wherein the first storage array maintains a first replica of a replicated volume comprising contiguous logical block addresses that map to non-contiguous addresses of the first data storage drives; and
- a second storage array comprising a plurality of interconnected second computing nodes, each of the second computing nodes comprising at least one processor and non-transitory memory, and a plurality of groups of second data storage drives, each group of second data storage drives connected with one of the second computing nodes, wherein the second storage array maintains a second replica of the replicated volume comprising contiguous logical block addresses that map to non-contiguous addresses of the second data storage drives;
- wherein the first storage array is responsive to a write command from a host to generate a notification that the replicated volume will be updated, the notification being generated before data associated with the write command is received by the first storage array and before the data associated with the write command is received by the second storage array and comprising information that enables implementation of pre-processing steps to prepare for subsequent receipt of data associated with the write command, the information comprising logical block addresses that will be affected by the write command;
- wherein the first storage array provides the notification to the second storage array before the data associated with the write command is received by the first storage array and before the data associated with the write command is received by the second storage array; and
- wherein the first storage array implements the pre-processing steps to prepare for receipt of the data and at least partly concurrently with implementation of the pre-processing steps by the second storage array and before the data associated with the write command is received by the first storage array and before the data associated with the write command is received by the second storage array, the pre-processing comprising locking the logical block addresses that will be affected by the write command.

14. The system of claim 13 wherein the pre-processing steps comprise identifying metadata associated with the impending IO.

15. The system of claim 14 wherein the pre-processing steps comprise using the identified metadata to identify locations in volatile memory associated with the impending IO.

16. The system of claim 15 wherein the pre-processing steps comprise locking the identified locations.

17. The system of claim 13 wherein the first storage array writes the data to the memory at least partly concurrently with the second storage array writing the data to memory.

* * * * *